US010296266B2

(12) United States Patent
Sako

(10) Patent No.: US 10,296,266 B2
(45) Date of Patent: May 21, 2019

(54) PRINTING APPARATUS THAT ALLOWS AN ADMINISTRATOR TO DETERMINE WHETHER TO EXECUTE REGISTRATION OF THE PRINTING APPARATUS TO A PRINTING SERVICE ON THE INTERNET UPON RECEIVING A REGISTRATION REQUEST, AND CONTROL METHOD AND PROGRAM FOR THE APPARATUS

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/574,517

(22) PCT Filed: Jul. 15, 2016

(86) PCT No.: PCT/JP2016/003365
§ 371 (c)(1),
(2) Date: Nov. 16, 2017

(87) PCT Pub. No.: WO2017/017925
PCT Pub. Date: Feb. 2, 2017

(65) Prior Publication Data
US 2018/0129454 A1 May 10, 2018

(30) Foreign Application Priority Data
Jul. 27, 2015 (JP) ................................ 2015-148034

(51) Int. Cl.
G06F 3/12 (2006.01)
(52) U.S. Cl.
CPC .......... G06F 3/1205 (2013.01); G06F 3/1204 (2013.01); G06F 3/1222 (2013.01);
(Continued)

(58) Field of Classification Search
None
See application file for complete search history.

(56) References Cited

U.S. PATENT DOCUMENTS 8,384,940 B2 2/2013 Sako et al.
8,576,422 B2 11/2013 Kimura
(Continued)

FOREIGN PATENT DOCUMENTS

EP 2204731 A2 7/2010
EP 2846252 A1 3/2015

OTHER PUBLICATIONS

International Search Report and Written Opinion dated Oct. 5, 2016, in international application PCT/JP2016/003365.

Primary Examiner — Andrew H Lam
(74) Attorney, Agent, or Firm — Venable LLP

(57) ABSTRACT

A printing apparatus that can be registered to a printing service on the Internet includes at least one processor that executes instructions to execute a registration to a printing service upon receiving an instruction to execute registration to the printing service via a registration screen displayed on a display, and an administrator successfully logging in to the printing apparatus via an administrator login screen displayed on the display. In a case in which a system management setting is OFF, the display displays the registration screen used for providing the instruction to execute the registration to the printing service, and the at least one processor executes the registration to the printing service in response to the instruction to execute the registration to the printing service.

12 Claims, 13 Drawing Sheets

(52) U.S. Cl.
CPC .......... *G06F 3/1224* (2013.01); *G06F 3/1236* (2013.01); *G06F 3/1287* (2013.01); *G06F 3/1288* (2013.01)

(56) References Cited

U.S. PATENT DOCUMENTS

| | | |
|---|---|---|
| 8,755,065 B2 | 6/2014 | Kimura |
| 8,867,070 B2 | 10/2014 | Jazayeri et al. |
| 8,970,889 B2 | 3/2015 | Sako |
| 9,041,968 B2 | 5/2015 | Kimura |
| 9,311,037 B2 | 4/2016 | Kuribara |
| 9,354,828 B2 | 5/2016 | Kimura |
| 2015/0234621 A1* | 8/2015 | Kimura ................ G06F 3/1203 358/1.15 |
| 2015/0261482 A1* | 9/2015 | Takano ................ G06F 3/1205 358/1.15 |
| 2016/0173710 A1 | 6/2016 | Kuribara |

* cited by examiner

[Fig. 1]
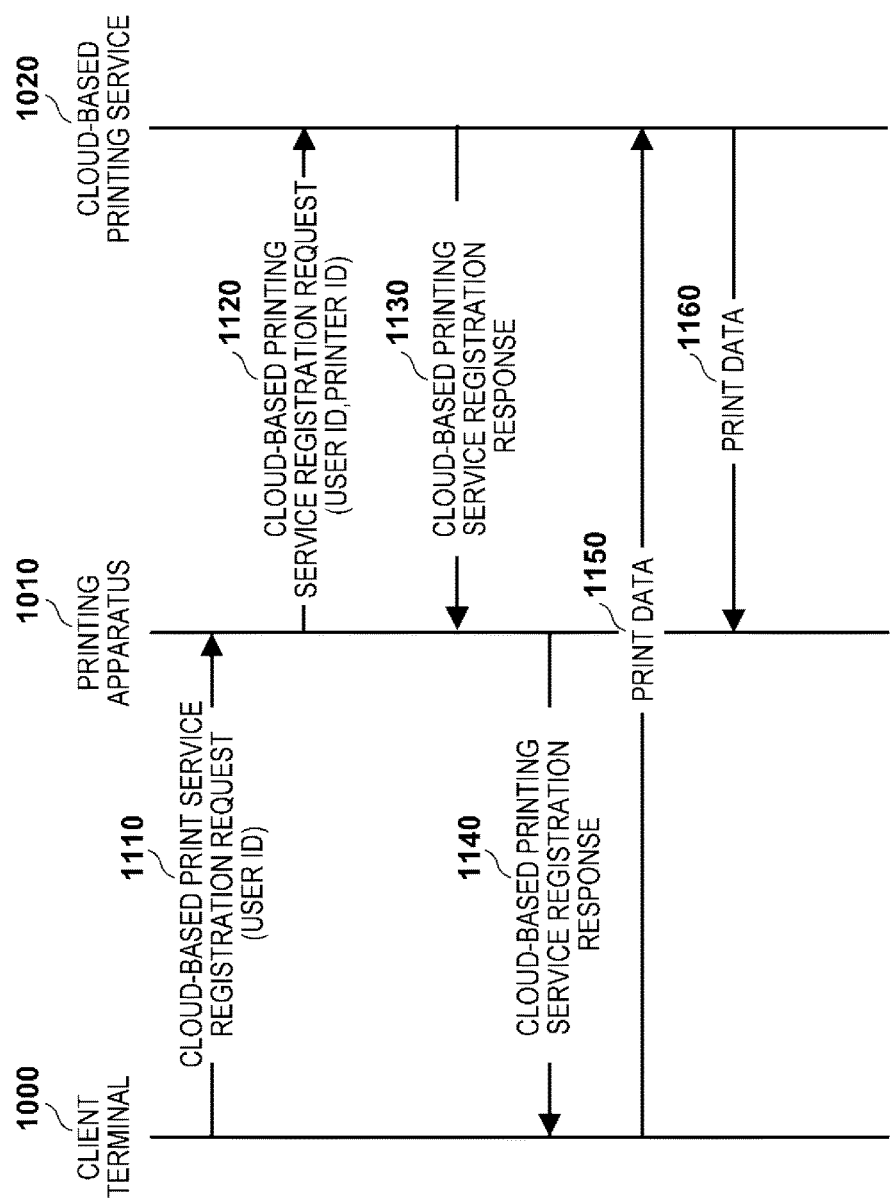

[Fig. 2]
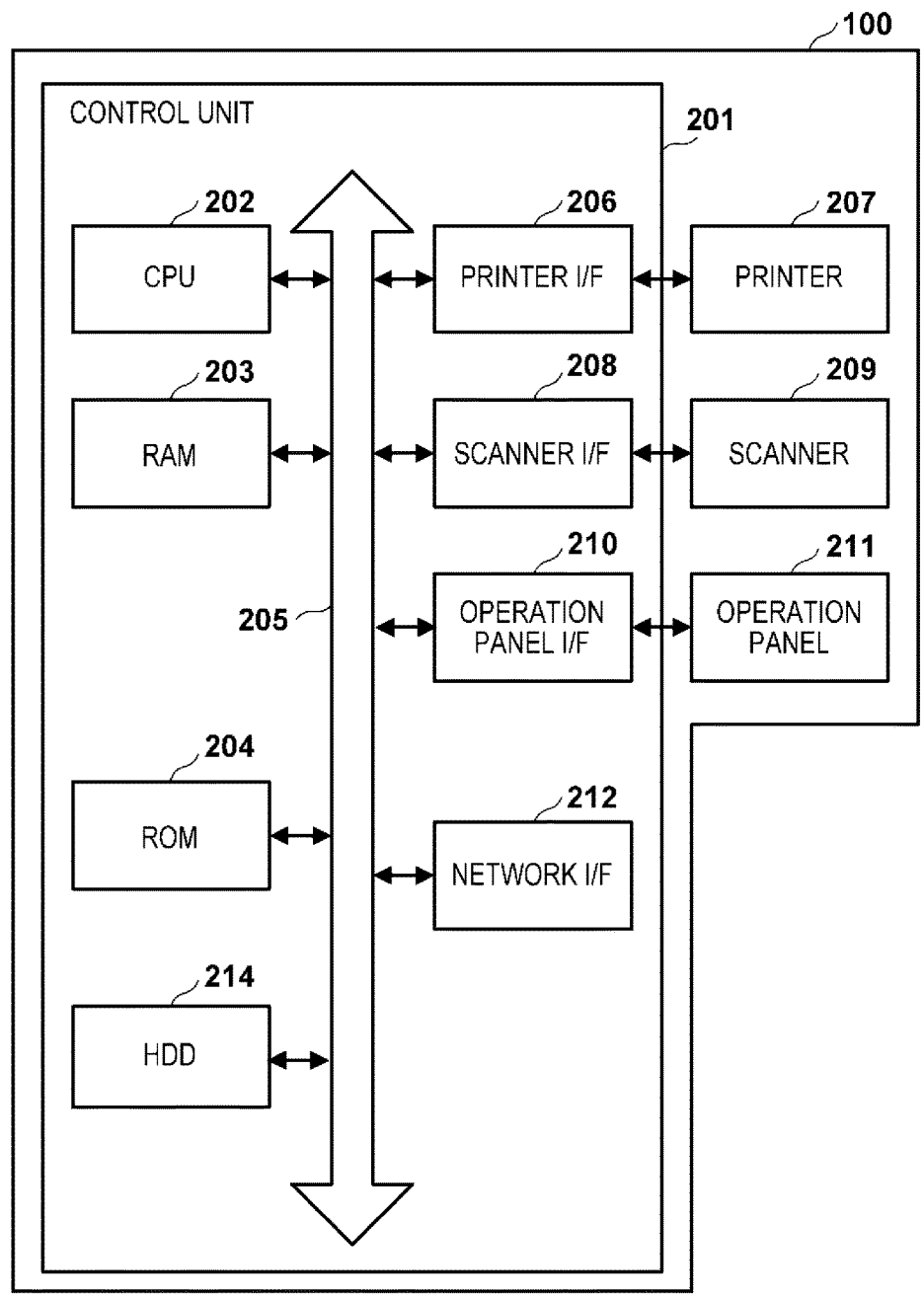

[Fig. 3]
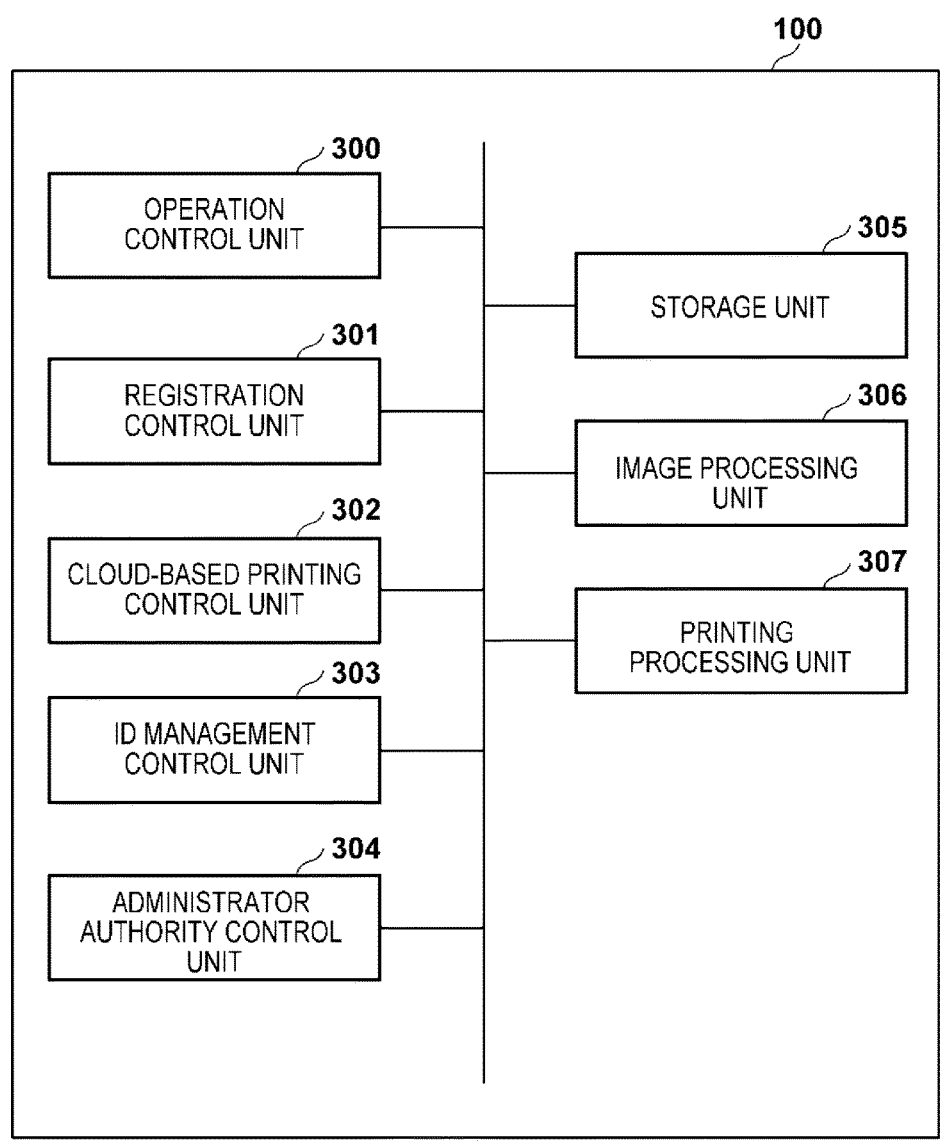

[Fig. 4]
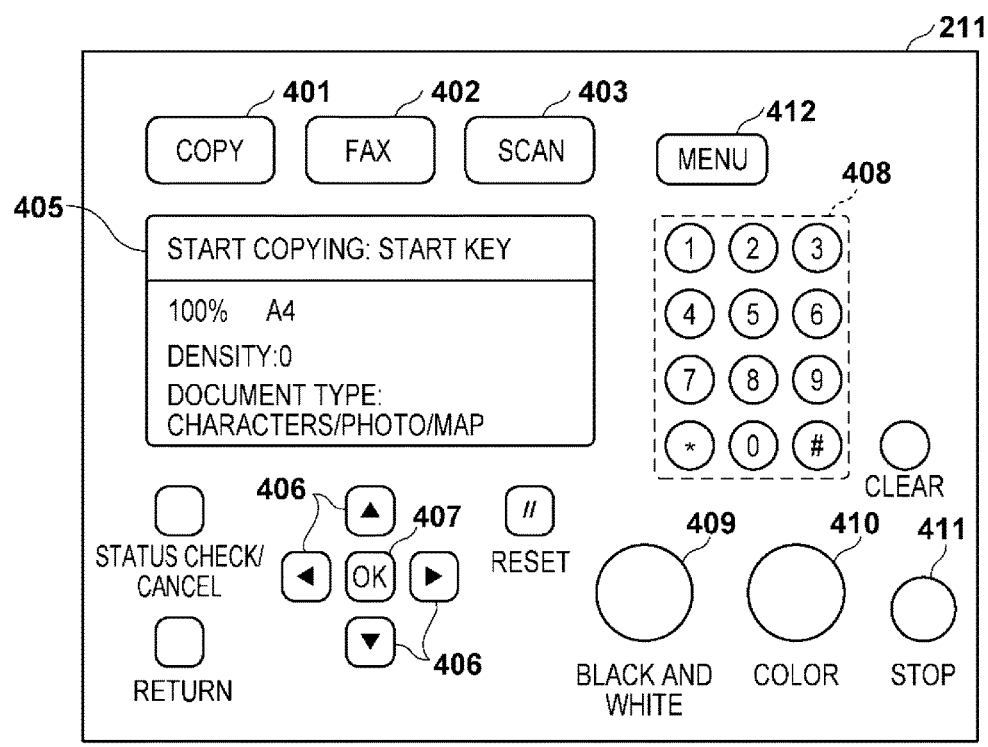

[Fig. 5]
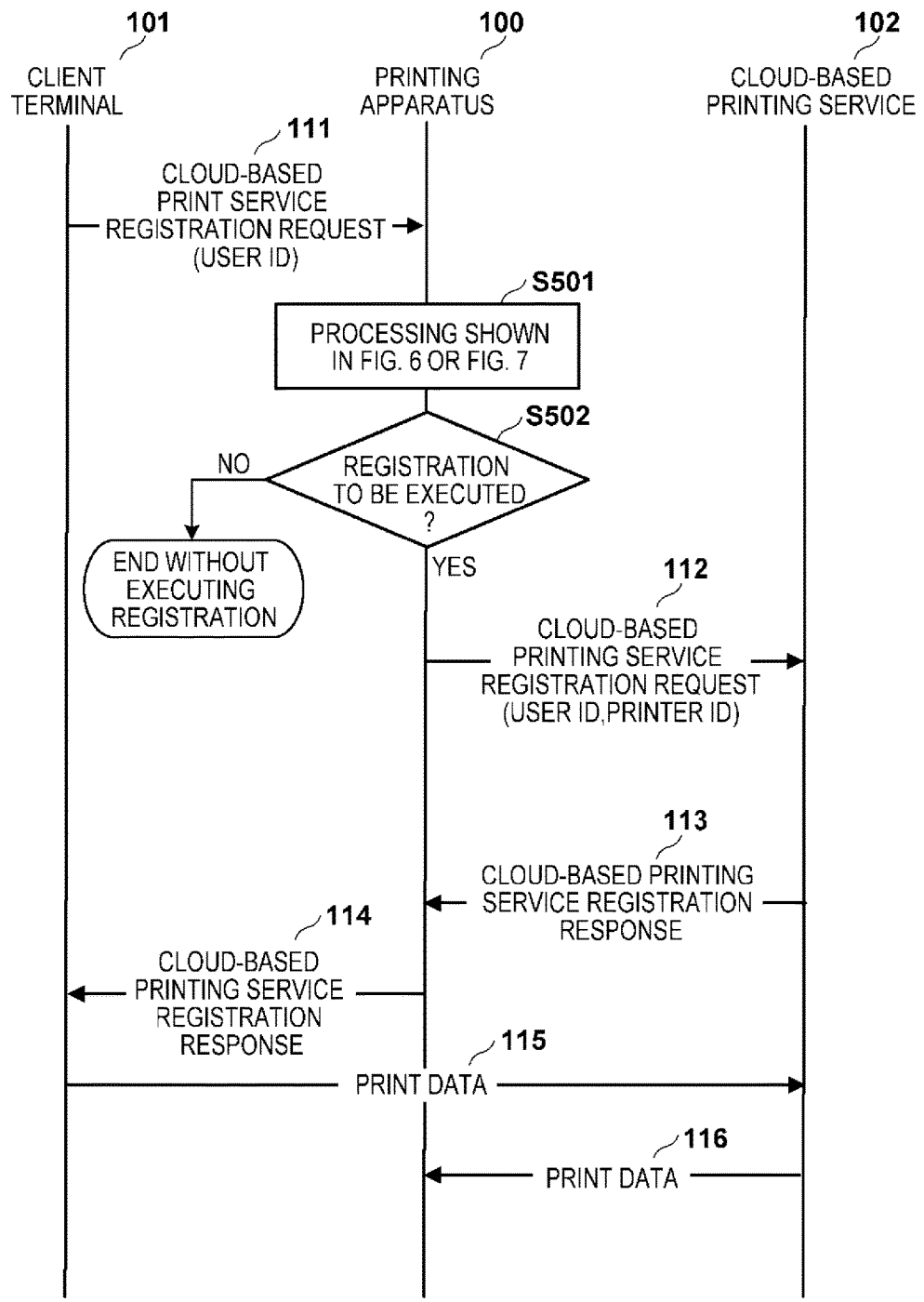

[Fig. 6]
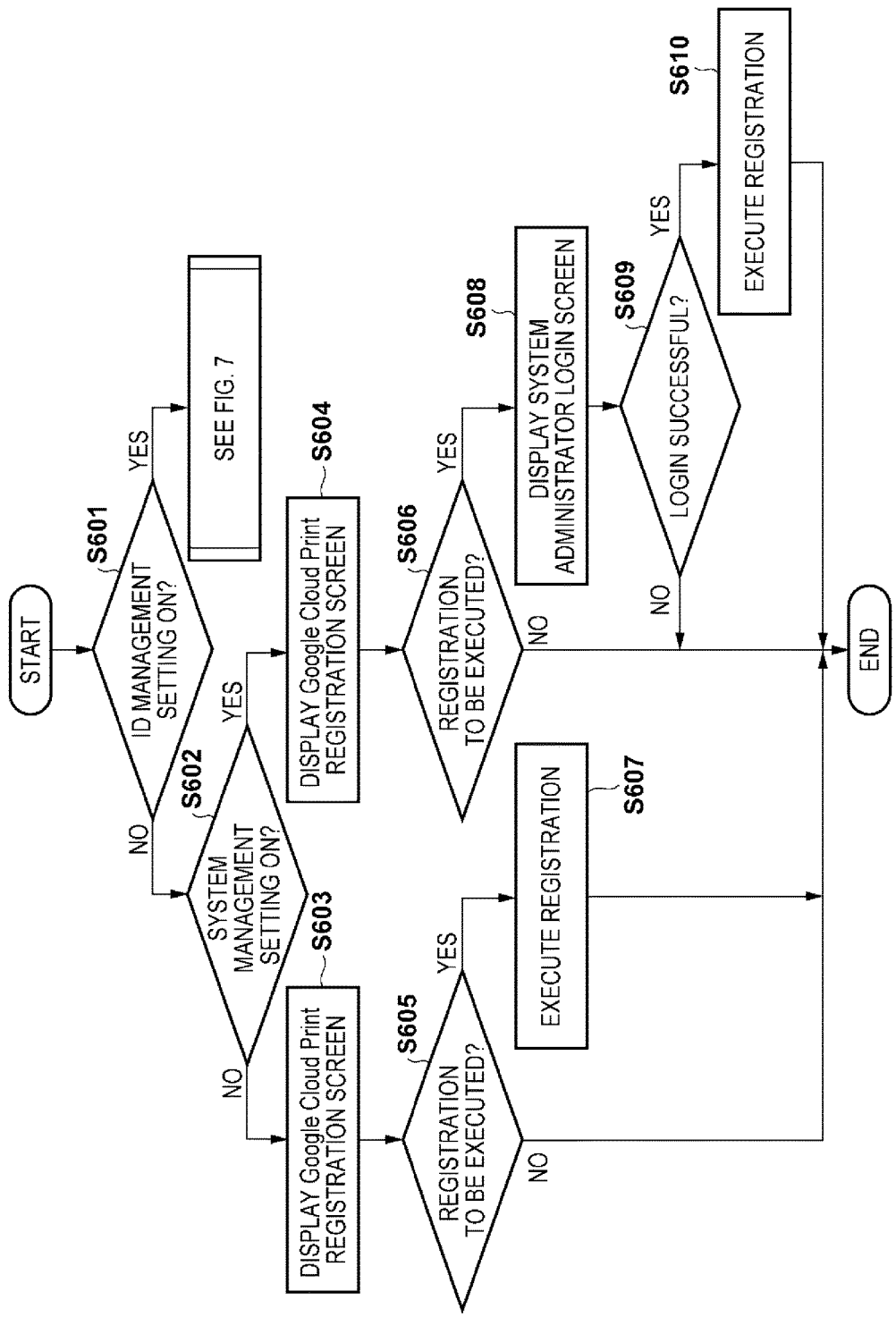

[Fig. 7]
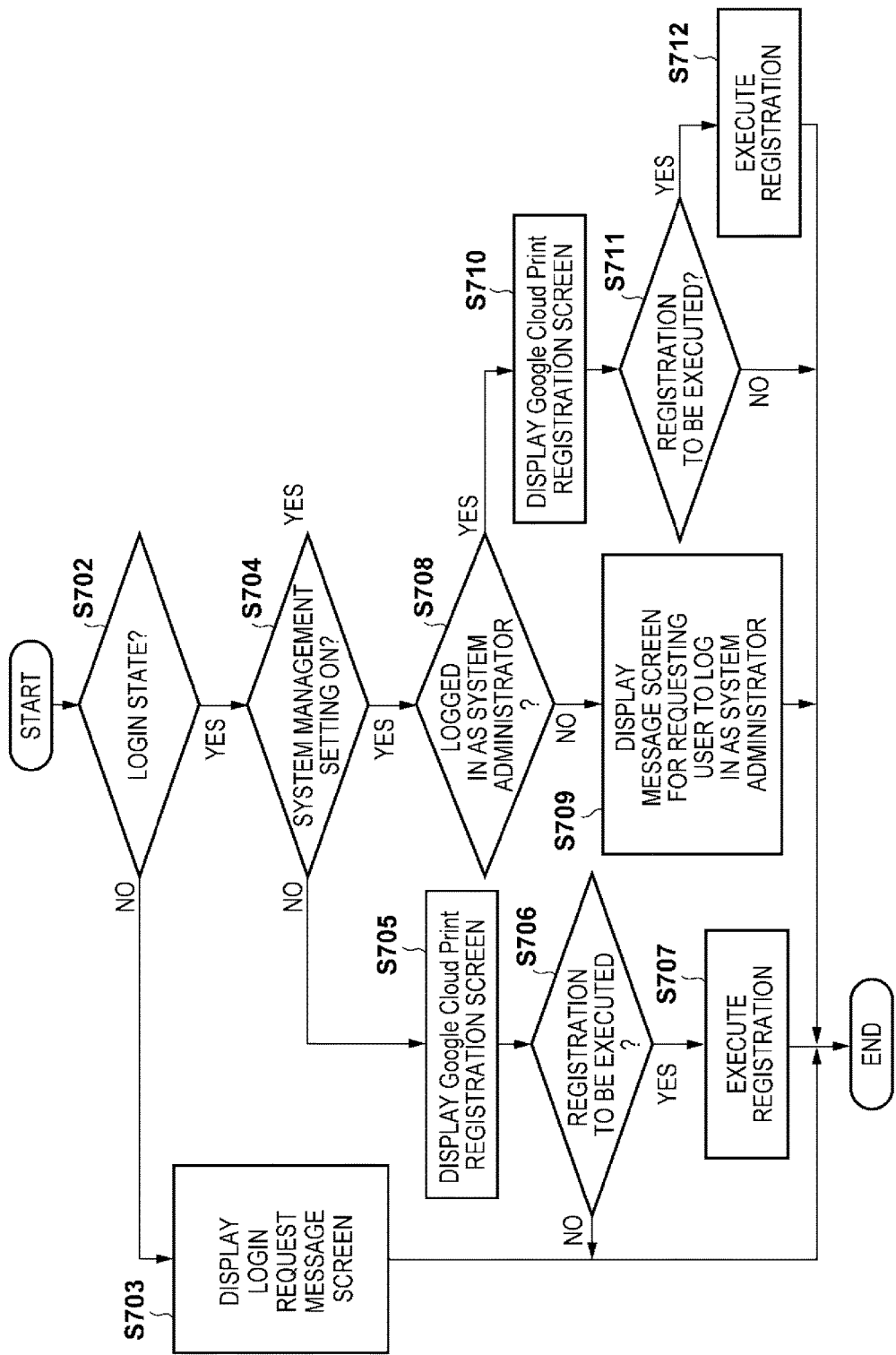

[Fig. 8]
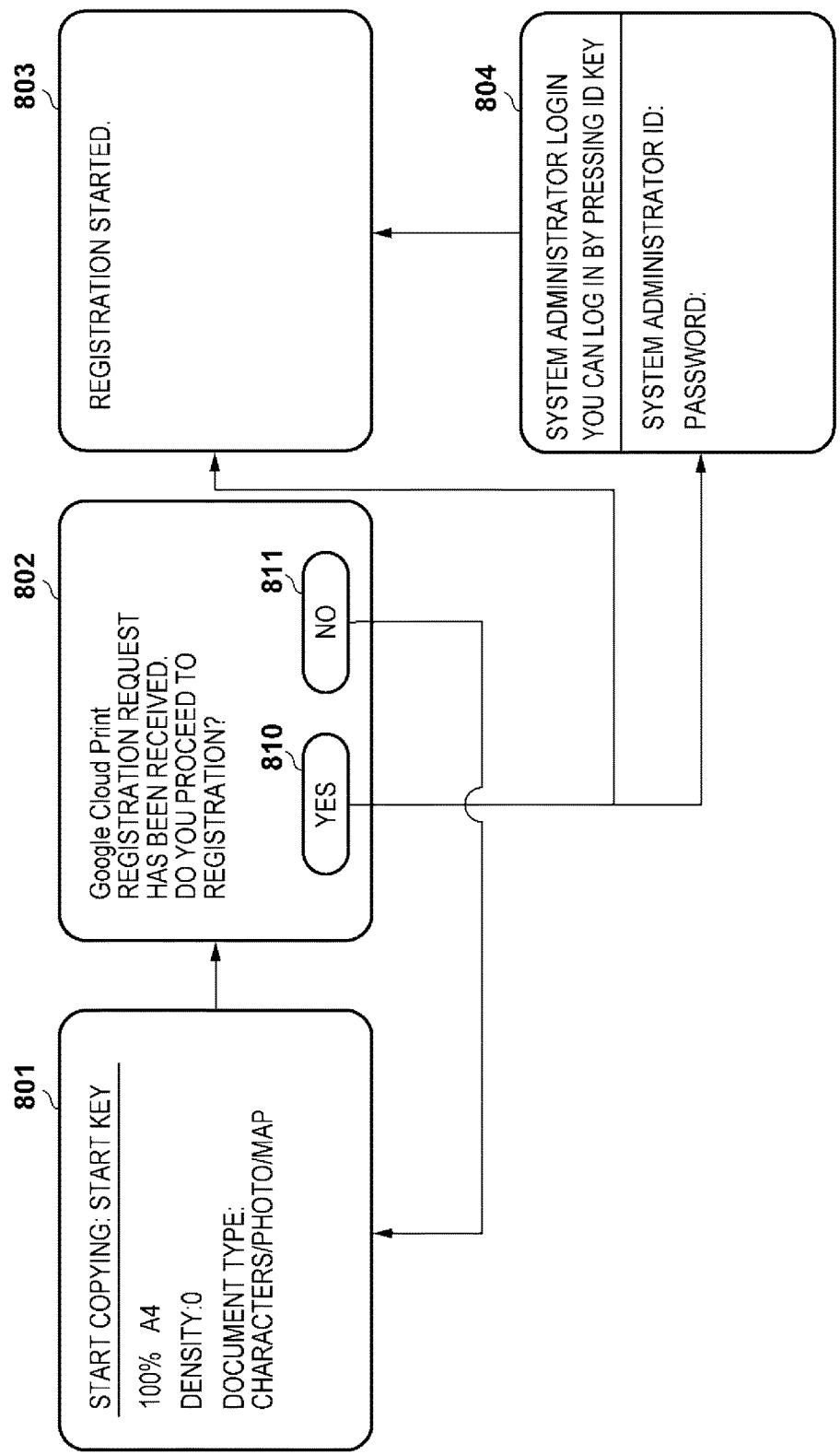

[Fig. 9]
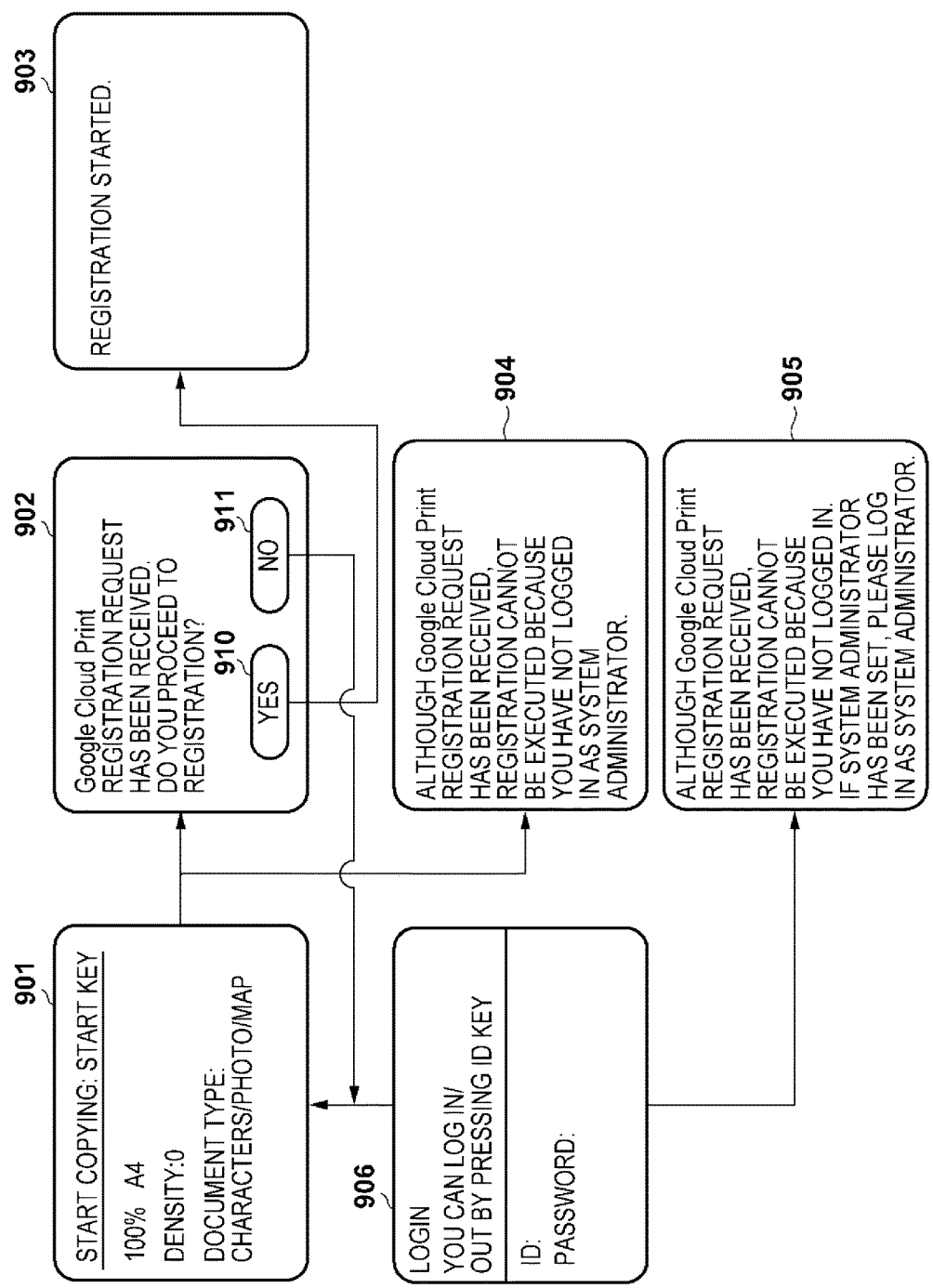

[Fig. 10]
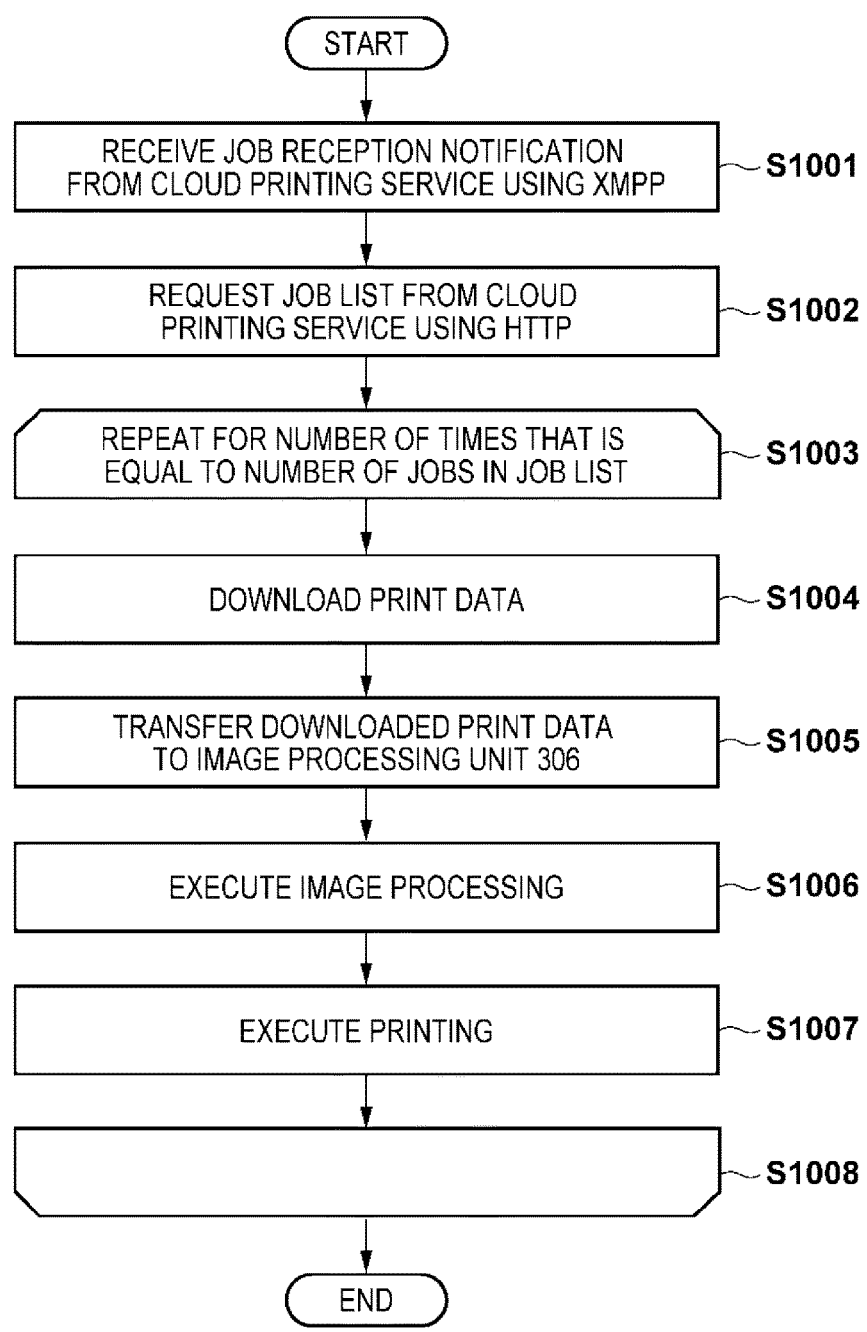

[Fig. 11]
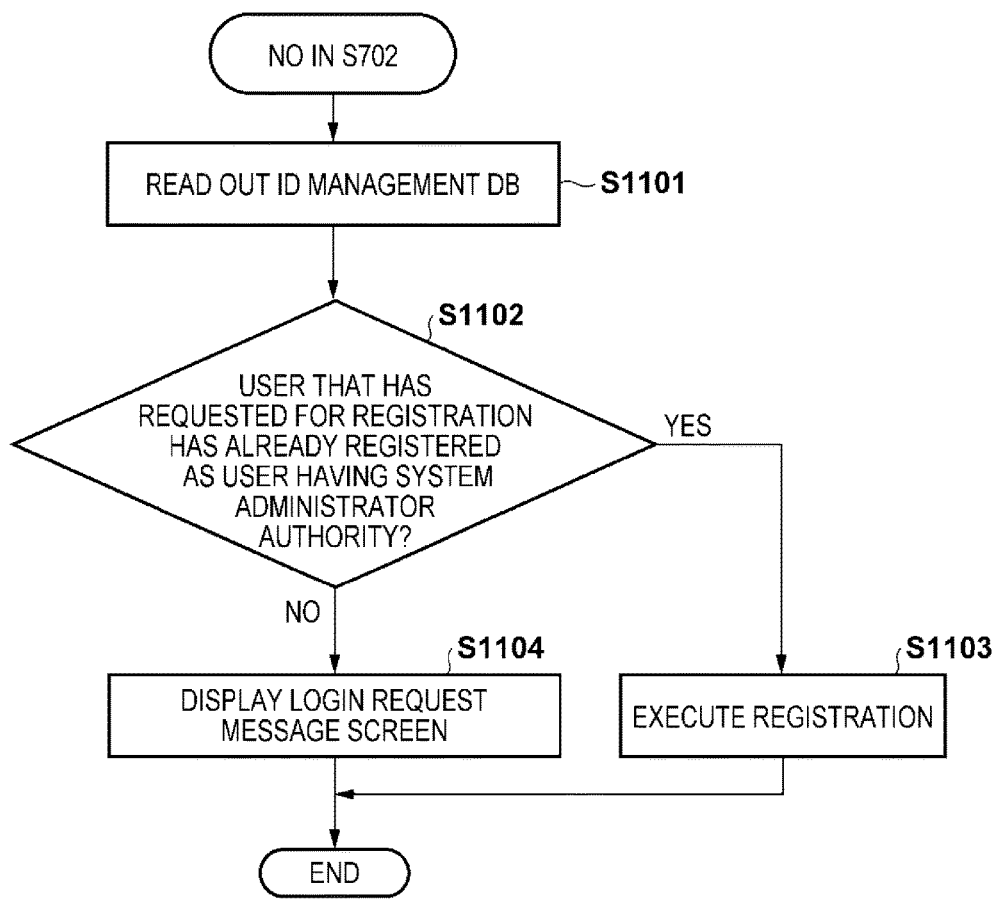

[Fig. 12]
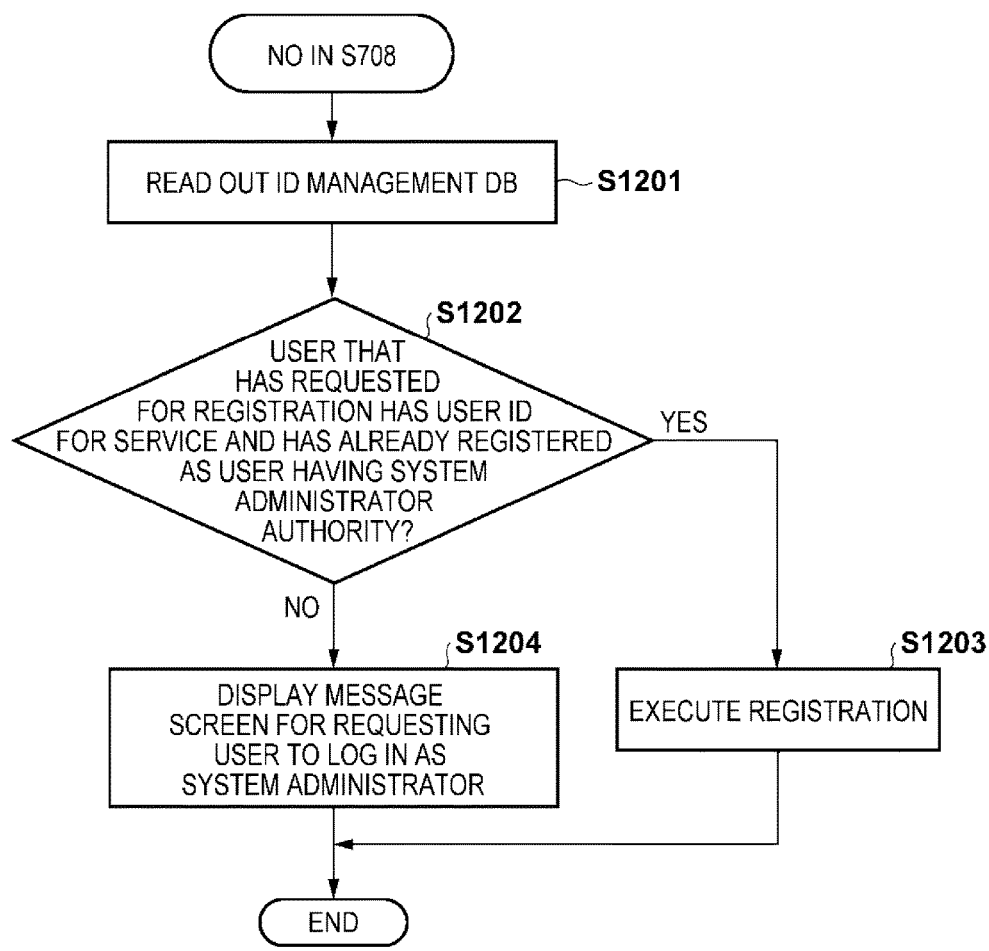

[Fig. 13]

| USER NAME | Google Cloud Print USER ID | SYSTEM ADMINISTRATOR AUTHORITY |
|---|---|---|
| Alice | alice@gmail.com | YES |
| Bob | bob@gmail.com | NO |
| Carol |  | YES |

1301, 1302, 1303, 1300

PRINTING APPARATUS THAT ALLOWS AN ADMINISTRATOR TO DETERMINE WHETHER TO EXECUTE REGISTRATION OF THE PRINTING APPARATUS TO A PRINTING SERVICE ON THE INTERNET UPON RECEIVING A REGISTRATION REQUEST, AND CONTROL METHOD AND PROGRAM FOR THE APPARATUS

This application claims the benefit of Japanese Patent Application No. 2015-148034 filed on Jul. 27, 2015, which is hereby incorporated by reference herein in its entirety.

TECHNICAL FIELD

The present invention relates to a printing apparatus, a control method, and a program for the printing apparatus.

BACKGROUND ART

In conventional printing services, printing is performed upon a user transmitting a print job directly to a printing apparatus from a client terminal, such as a personal computer (PC).

Meanwhile, in recent years, cloud-based printing services on the Internet, such as Google® Cloud Print envisaged by Google Inc., of Mountain View, Calif., United States, have been proposed.

FIG. 1 is a diagram illustrating a processing sequence of Google® Cloud Print. It is assumed that a printing apparatus 1010 supports Google® Cloud Print functions, and a client terminal 1000 supports Google® Cloud Print client functions. A cloud-based printing service 1020 represents a cloud-based printing service on the Internet.

The user first transmits a cloud-based print service registration request 1110 from the client terminal 1000 to the printing apparatus 1010. The registration request 1110 includes a user ID that is information that identifies a user who is requesting the service. Upon receiving the registration request 1110, the printing apparatus 1010 transmits a cloud-based printing service registration request 1120 to the cloud-based printing service 1020. The cloud-based printing service registration request 1120 includes the user ID included in the registration request 1110 from the client terminal 1000, and a unique printer ID of the printing apparatus 1010. Upon receiving the registration request 1120 from the printing apparatus 1010, the cloud-based printing service 1020 associates the user ID and the printer ID included in the registration request 1120 with each other, and registers the printing apparatus 1010 as a printing apparatus that can execute Google® Cloud Print. Then, the cloud-based printing service 1020 returns the result of registration to the printing apparatus 1010, using a cloud-based printing service registration response 1130. Upon receiving the response 1130, the printing apparatus 1010 returns the contents of the response 1130, in the form of a cloud-based printing service registration response 1140, to the client terminal 1000. Upon receiving the response 1140, the client terminal 1000 recognizes the printing apparatus 1010 as a printing apparatus that can execute Google® Cloud Print.

Next, the user transmits print data 1150 to a logical printer for the cloud-based printing service 1020 that corresponds to the printing apparatus 1010. In response, the cloud-based printing service 1020 converts the print data 1150 thus received into print data 1160 that is formatted to be executable by the printing apparatus 1010. Then, the cloud-based printing service 1020 transmits the print data 1160 thus converted to the printing apparatus 1010, and, in response, the printing apparatus 1010 executes printing based on the print data 1160 thus received. U.S. Pat. No. 8,867,070 discloses the configuration of the above-described cloud-based printing service.

Usually, administrator authority functions are set to a printing apparatus, and such a printing apparatus is managed by being set up to allow only administrators to change the settings of the printing apparatus (e.g. ON/OFF settings of various print protocols that include cloud-based printing service functions). In the case of a printing apparatus that has been set up in such a manner, a user is requested to log in to the printing apparatus as an administrator upon the user making an attempt to change a setting among various settings of the printing apparatus from a user interface (UI).

According to the technology disclosed in the above-described U.S. Pat. No. 8,867,070, however, upon a printing apparatus receiving a cloud-based printing service registration request from a client terminal, the printing apparatus immediately transmits a registration request to the cloud-based printing service on the Internet, and the printing apparatus is thus registered to the service. Such a configuration allows non-administrators to execute registration to the cloud-based printing service, and causes inconsistency with a policy related to the setting change of the printing apparatus.

An object of the present invention is to solve the problem in the above-described conventional technology.

SUMMARY OF THE INVENTION

The present invention enables realization of technology for performing control to allow an administrator of a printing apparatus to determine whether or not to execute registration of the printing apparatus to a printing service on the Internet upon the printing apparatus receiving a registration request.

In one aspect, the present invention provides a printing apparatus that can be registered to a printing service on the Internet, the printing apparatus comprising display means for displaying an administrator login screen upon receipt of a request for registration to the printing service from a client in a case in which a setting of the printing apparatus has required that the registration to the printing service is performed by an administrator, and registration means for executing registration to the printing service upon an administrator successfully logging in to the printing apparatus via the administrator login screen.

In another aspect, the present invention provides a printing apparatus that can be registered to a printing service on the Internet, the printing apparatus comprising display means for displaying registration screen used for executing registration to the printing service and an administrator login screen upon receipt of a request for registration to the printing service from a client in a case in which a system management setting of the printing apparatus is ON, and registration means for executing the registration to the printing service upon receiving an instruction to execute registration to the printing service via the registration screen and an administrator successfully logging in to the printing apparatus via the administrator login screen.

In yet another aspect, the present invention provides a control method for controlling a printing apparatus that can be registered to a printing service on the Internet, the control method comprising displaying an administrator login screen upon receipt of a request for registration to the printing service from a client in a case in which a setting of the printing apparatus has required that the registration to the printing service be performed by an administrator and executing the registration to the printing service upon an administrator successfully logging in to the printing apparatus via the administrator login screen.

In addition, in another aspect, the present invention provides a program for causing a computer to execute steps of a control method for controlling a printing apparatus that can be registered to a printing service on the Internet, the control method comprising displaying an administrator login screen upon receipt of a request for registration to the printing service from a client in a case in which a setting of the printing apparatus has required that the registration to the printing service be performed by an administrator, and executing the registration to the printing service upon an administrator successfully logging in to the printing apparatus via the administrator login screen.

Further features of the present invention will be apparent from the following description of exemplary embodiments with reference to the attached drawings.

BRIEF DESCRIPTION OF THE DRAWINGS

The attached drawings are included in the description, constitute a part of the description, illustrate embodiments of the present invention, and are used to describe the principle of the present invention in conjunction with the description of the embodiments.

FIG. 1 is a diagram illustrating a processing sequence of Google® Cloud Print.

FIG. 2 is a block diagram illustrating a hardware configuration of a printing apparatus according to an embodiment of the present invention.

FIG. 3 is a functional block diagram illustrating a software configuration of the printing apparatus according to the embodiment.

FIG. 4 is a top view of an operation panel of the printing apparatus according to the embodiment.

FIG. 5 is a diagram illustrating a processing sequence of a printing system according to Embodiment 1 of the present invention.

FIG. 6 is a flowchart illustrating processing performed when a printing apparatus according to Embodiment 1 of the present invention receives a cloud-based printing service registration request from a client terminal (in a case in which an ID management setting is OFF).

FIG. 7 is a flowchart illustrating processing performed when the printing apparatus according to Embodiment 1 of the present invention receives a cloud-based printing service registration request from a client terminal (in a case in which the ID management setting is ON).

FIG. 8 is a screen transition diagram corresponding to the flowchart illustrated in FIG. 6 that shows processing performed by the printing apparatus upon receipt of a cloud-based printing service registration request (in a case in which the ID management setting is OFF).

FIG. 9 is a screen transition diagram corresponding to the flowchart illustrated in FIG. 7 that shows processing performed by the printing apparatus upon receipt of the cloud-based printing service registration request (in a case in which the ID management setting is ON).

FIG. 10 is a flowchart illustrating processing performed by the printing apparatus according to Embodiment 1 when executing cloud printing.

FIG. 11 is a flowchart illustrating processing performed by a printing apparatus according to Embodiment 2 of the present invention.

FIG. 12 is a flowchart illustrating processing performed by the printing apparatus according to Embodiment 2 of the present invention.

FIG. 13 is a diagram illustrating an ID management DB held by the printing apparatus according to Embodiment 2.

DESCRIPTION OF THE EMBODIMENTS

Embodiments of the present invention will now be described in detail with reference to the drawings. It should be noted that the relative arrangement of the components, the numerical expressions, and the numerical values set forth in these embodiments do not limit the scope of the present invention unless it is specifically stated otherwise.

FIG. 2 is a block diagram illustrating a hardware configuration of a printing apparatus 100 according to an embodiment of the present invention. Here, it is assumed that the printing apparatus 100 is included in a system shown in FIG. 5 and described below, and is connected to a client terminal and a cloud-based printing service via a network.

A control unit 201 that includes a CPU 202 controls an overall operation of the printing apparatus 100. The CPU 202 reads out a control program stored in a ROM 204 or an HDD 214, and performs various kinds of control, such as communication control. A RAM 203 is used as temporary storage areas, such as a main memory and a work area for the CPU 202. The HDD 214 stores data, various programs, and various information tables. A printer OF 206 serves as an interface that outputs an image signal to a printer 207 (a printer engine). A scanner OF 208 serves as an interface to which an image signal from a scanner 209 (a scanner engine) is input. At the time of a copying operation, the CPU 202 processes an input image signal received via the scanner OF 208, and outputs the processed signal to the printer OF 206 as a recording image signal. An operation panel OF 210 connects an operation panel 211 and the control unit 201 to each other. The operation panel 211 is provided with a display unit having touch panel functions, and a keyboard. A network OF 212 transmits information to external apparatuses, such as a client terminal and a cloud-based printing service, and receives various kinds of information from the external apparatuses. The blocks included within the control unit 201 are connected to each other via a system bus 205.

FIG. 3 is a functional block diagram illustrating a software configuration of the printing apparatus 100 according to the embodiment. Note that each functional unit shown in FIG. 3 is realized by the CPU 202 included in the printing apparatus 100 executing a program that has been loaded from the ROM 204 or the HDD 214 to the RAM 203.

An operation control unit 300 controls the operation panel 211, displays an operation menu on the operation panel 211, awaits an instruction to be input from a user, and notifies other functional units of the contents of the instruction thus received. The operation control unit 300 also displays the results of processing that has been executed by other functional units according to the instruction on the operation panel 211. A registration control unit 301 that controls registration to the cloud-based printing service analyzes a cloud-based printing service registration request received from a client terminal, and transmits a registration request to the cloud-based printing service. The registration control unit 301 thus controls registration to the cloud-based printing service.

A cloud-based printing control unit 302 performs control to transfer print data that has been received from the cloud-based printing service, together with a print request, to an image processing unit 306. An ID management control unit 303 manages an ID management setting stored by a storage unit 305, and a current ID login state. An administrator authority control unit 304 manages an administrator authority setting stored by the storage unit 305. The storage unit 305 stores specified data in the RAM 203 or the HDD 214, or reads out data stored therein, according to an instruction from another functional unit. Examples of data managed by the storage unit 305 include an ID management database (DB) and administrator setting information for the printing apparatus 100. The image processing unit 306 performs processing to generate print image data by performing rendering based on a print job. A printing processing unit 307 performs processing to transmit the image data to the printer 207 as an image signal via the printer OF 206, and to cause the printer 207 to perform printing. The image data is generated by the image processing unit 306 performing rendering.

FIG. 4 is a top view of the operation panel 211 of the printing apparatus 100 according to the embodiment.

The operation panel 211 has a display unit 405, such as a liquid crystal display, and is also provided with touch panel functions. A copy button 401 is a button used for instructing the printing apparatus 100 to perform a copy operation. Upon the user pressing the copy button 401, a copy operation screen is displayed on the display unit 405. FIG. 4 shows a situation in which a copy menu screen is displayed on the display unit 405 in response to the copy button 401 being pressed. A FAX button 402 is a button used for instructing the printing apparatus 100 to perform FAX transmission. Upon the user pressing the FAX button 402, a FAX operation screen is displayed on the display unit 405. A scan button 403 is a button used for instructing the printing apparatus 100 to perform a scan operation. Upon the user pressing the scan button 403, a scan operation screen is displayed on the display unit 405. A numeric keypad 408 is used by the user when inputting a number, or the like. An OK key 407 is used by the user when confirming the contents displayed on the display unit 405, for example. Direction keys 406 include move keys used for moving a cursor in the upward, downward, left, and right directions, and are used when the user selects a menu, or the like, displayed on the display unit 405. A black-and-white copy key 409 and a color copy key 410 are used for making an instruction to start copying in a black-and-white mode and a color mode, respectively. A stop key 411 is used for stopping processing that is currently being executed. A menu key 412 is used by the user when displaying a menu screen for setting the printing apparatus 100.

The following describes operations performed by the printing apparatus 100 when receiving a cloud-based printing service registration request, described below with reference to FIG. 5, using two embodiments, namely Embodiments 1 and 2. Note that Embodiment 2 includes Embodiment 1, and, therefore, a description of Embodiment 2 only refers to the difference from Embodiment 1.

Embodiment 1

FIG. 5 is a diagram illustrating a processing sequence of a printing system according to Embodiment 1 of the present invention. Here, it is assumed that the printing apparatus 100 supports the above-described Google® Cloud Print functions, for example, and a client terminal 101 supports Google® Cloud Print client functions. A cloud-based printing service 102 represents a cloud-based printing service on the Internet.

Here, the user first transmits a cloud-based printing service registration request 111 from the client terminal 101 to the printing apparatus 100. The registration request 111 includes a user ID for the service. Upon receiving the registration request 111, the printing apparatus 100, in step S501, executes processing shown in FIG. 6 or FIG. 7, described below, and in step S502, determines whether or not to execute registration to the cloud-based printing service 102. Upon determining not to execute registration, the printing apparatus 100 immediately ends processing. Upon determining to execute registration in step S502, the printing apparatus 100 transmits a cloud-based printing service registration request 112 to the cloud-based printing service 102. The cloud-based printing service registration request 112 includes the user ID included in the registration request 111 from the client terminal 101, and a unique printer ID of the printing apparatus 100. Upon receiving the registration request 112 from the printing apparatus 100, the cloud-based printing service 102 associates the user ID and the printer ID included in the registration request 112 with each other, and registers the printing apparatus 100 as a printing apparatus that can execute Google® Cloud Print. Then, the cloud-based printing service 102 returns the result of registration to the printing apparatus 100, using a cloud-based printing service registration response 113. Upon receiving the response 113, the printing apparatus 100 returns the contents of the response 113 to the client terminal 101, using a cloud-based printing service registration response 114. Upon receiving the response 114, the client terminal 101 recognizes the printing apparatus 100 as a printing apparatus that can execute Google® Cloud Print.

Next, the user transmits print data 115 to a logical printer for the cloud-based printing service 102 that corresponds to the printing apparatus 100. Consequently, the cloud-based printing service 102 converts the print data 115 thus received into print data 116 that is formatted to be executable by the printing apparatus 100. Then, the cloud-based printing service 102 transmits the print data 116 thus converted, to the printing apparatus 100, and consequently, the printing apparatus 100 executes printing based on the print data 116 thus received.

This concludes an overview of processing according to Embodiment 1 of the present invention.

FIG. 6 is a flowchart illustrating processing performed when the printing apparatus 100 according to Embodiment 1 of the present invention receives the cloud-based printing service registration request 111 from the client terminal 101 (in a case in which an ID management setting is OFF). Note that a program used for executing this processing is stored in the ROM 204 or the HDD 214, for example. When the processing is to be executed, the program is loaded to the RAM 203, and is then executed under the control of the CPU 202. The processing is thus realized.

This processing is started upon the printing apparatus 100 receiving the cloud-based printing service registration request 111 from the client terminal 101, and first, in step S601, the CPU 202 determines whether the ID management setting is ON or OFF. Processing performed in the case in which the ID management setting is ON is described below with reference to FIG. 7.

Upon determining that the ID management setting is OFF, the CPU 202 proceeds to step S602, and determines whether a system management setting is ON or OFF. Upon determining that the system management setting is OFF, the CPU 202 proceeds to step S603, and displays a Google® Cloud Print registration screen 802, as shown in FIG. 8 for example, on the operation panel 211. Next, the CPU 202 proceeds to step S605, and determines whether or not a "YES" button 810 on the registration screen 802 has been pressed. Upon determining that the "YES" button 810 has been pressed, the CPU 202 proceeds to step S607. The "YES" button 810 is used for making an instruction to continue registration. In step S607, the CPU 202 transmits the cloud-based printing service registration request 112 to the cloud-based printing service 102, thereby executing registration to the cloud-based printing service 102, and ends this processing. Upon determining in step S605 that a "NO" button 811 has been pressed, the CPU 202 immediately ends this processing. Processing performed in this case is the same as the conventional processing described above with reference to FIG. 1.

Upon determining that the system management setting is ON in step S602, the CPU 202 proceeds to step S604, and displays the Google® Cloud Print registration screen 802, shown in FIG. 8, for example, on the operation panel 211. Next, the CPU 202 proceeds to step S606, and determines whether or not the "YES" button 810 on the registration screen 802 has been pressed. Upon determining that the "YES" button 810 has been pressed, the CPU 202 proceeds to step S608. The "YES" button 810 is used for making an instruction to continue registration. In step S608, the CPU 202 displays a system administrator login screen 804, shown in FIG. 8, for example, on the operation panel 211. The administrator inputs an administrator ID and a password from the system administrator login screen 804.

Next, the CPU 202 proceeds to step S609, and determines whether or not the user (the administrator) has successfully logged in to the printing apparatus 100. Upon determining that the user has been successfully logged in to the printing apparatus 100, the CPU 202 proceeds to step S610. In step S610, the CPU 202 transmits the cloud-based printing service registration request 112 to the cloud-based printing service 102, thereby executing registration to the cloud-based printing service 102, and ends this processing. Upon determining in step S609 that the user has failed to log in to the printing apparatus 100, the CPU 202 immediately ends the processing. Also, upon determining in step S606 that the "NO" button 811 on the registration screen 802 has been pressed, the CPU 202 immediately ends the processing.

As described above, in the case in which the ID management setting is OFF, i.e., in the case in which processing to be executed does not vary depending on the user ID, if the system management setting is OFF, i.e., if a user that is not an administrator is allowed to execute registration, the Google® Cloud Print registration screen is displayed so that the user can execute registration. On the other hand, if the system management setting is ON, i.e., if registration is only allowed for an administrator who has logged in to the printing apparatus 100, the CPU 202 displays the login screen 804 upon being instructed to execute registration on the registration screen 802, and registration to the cloud-based printing service 102 becomes executable only after the administrator successfully logs in to the printing apparatus 100. Thus, even if the ID management setting is OFF, registration to the cloud-based printing service 102 becomes executable on condition that the user logs in to the printing apparatus 100 as a system administrator.

FIG. 7 is a flowchart illustrating processing performed when the printing apparatus 100 according to Embodiment 1 of the present invention receives the cloud-based printing service registration request 111 from the client terminal 101 (in a case in which the ID management setting is ON). Note that a program used for executing this processing is stored in the ROM 204 or the HDD 214, for example. When the processing is to be executed, the program is loaded to the RAM 203, and is then executed under the control of the CPU 202. The processing is thus realized. This processing is executed when it is determined in step S601, shown in FIG. 6, that the ID management setting is ON.

First, in step S702, the CPU 202 determines whether or not the printing apparatus 100 is in a log-in state (i.e. a user has logged in to the printing apparatus 100). Here, upon determining that the printing apparatus 100 is in a non-login state (i.e. a user has not logged in to the printing apparatus 100), the CPU 202 proceeds to step S703, displays a login request message screen 905, as shown in FIG. 9, for example, on the operation panel 211, and ends this processing. On the other hand, upon determining in step S702 that the printing apparatus 100 is in the login state, the CPU 202 proceeds to step S704, and determines whether the system management setting is ON or OFF. Here, upon determining that the system management setting is OFF, the CPU 202 proceeds to step S705, and displays a Google® Cloud Print registration screen 902, as shown in FIG. 9, for example, on the operation panel 211. Next, the CPU 202 proceeds to step S706, and determines whether or not a "YES" button 910 on the registration screen 902 has been pressed. The "YES" button 910 is used for making an instruction to execute registration. Upon determining that the "YES" button 910 has been pressed, the CPU 202 proceeds to step S707, and transmits the cloud-based printing service registration request 112 to the cloud-based printing service 102, thereby executing cloud-based printing service registration. Upon determining in step S706 that a "NO" button 911 has been pressed, the CPU 202 immediately ends this processing.

Upon determining in step S704 that the system management setting is ON, the CPU 202 proceeds to step S708, and determines whether or not the user has logged in to the printing apparatus 100 as a system administrator. Here, upon determining that the user has not logged in to the printing apparatus 100 as a system administrator, the CPU 202 proceeds to step S709, and displays, for example, a message screen 904, shown in FIG. 9, on the operation panel 211, requesting the user to log in to the printing apparatus 100 as a system administrator, and ends this processing.

Upon determining in step S708 that the user has logged in to the printing apparatus 100 as a system administrator, the CPU 202 proceeds to step S710, and displays the Google® Cloud Print registration screen 902, as shown in FIG. 9, for example, on the operation panel 211. Next, the CPU 202 proceeds to step S711, and determines whether or not the "YES" button 910 on the registration screen 902 has been pressed. The "YES" button 910 is used for making an instruction to execute registration. Upon determining that the "YES" button 910 has been pressed, the CPU 202 proceeds to step S712, and transmits the cloud-based printing service registration request 112 to the cloud-based printing service 102, thereby executing registration to the cloud-based printing service 102, and ends this processing. Upon determining in step S711 that the "NO" button 911 has been pressed, the CPU 202 immediately ends this processing.

As described above, in the case in which the ID management setting is ON, i.e., in the case in which processing to be executed varies depending on the user ID, if the system management setting is OFF, i.e., if a user that is not an administrator is allowed to execute registration, the Google® Cloud Print registration screen is displayed so that the user can execute registration.

If the system management setting is ON, i.e., if registration is only allowed for an administrator who has logged in to the printing apparatus 100, upon an instruction to execute registration being input from the registration screen 902, the CPU 202 displays the screen 904 for requesting the user to log in to the printing apparatus 100 as a system administrator. Thus, if the ID management setting is ON and the system management setting is OFF, the login user can execute registration to the cloud-based printing service 102. If the system management setting is ON, the user is allowed to execute registration to the cloud-based printing service 102 only after logging in to the printing apparatus 100 as a system administrator.

FIG. 8 is a screen transition diagram corresponding to the flowchart illustrated in FIG. 6 that shows processing performed by the printing apparatus 100 upon receipt of the cloud-based printing service registration request 111 (in a case in which the ID management setting is OFF).

A screen 801 is an initial screen for copying that is displayed when the copy button 401 of the printing apparatus 100 is pressed. Upon the printing apparatus 100 receiving the cloud-based printing service registration request 111 from the client terminal 101, the CPU 202 displays the Google® Cloud Print registration screen 802 on the display unit 405 of the operation panel 211. Upon the user selecting the "NO" button 811 on the Google® Cloud Print registration screen 802, the CPU 202 displays the default screen 801 again. On the other hand, upon the user selecting the "YES" button 810 on the Google Cloud Print registration screen 802, the CPU 202 displays a Google® Cloud Print registration start screen 803 on the display unit 405 if the system management setting is OFF. Then, the CPU 202 executes registration of the printing apparatus 100 to the cloud-based printing service 102.

If the system management setting is ON, the CPU 202 displays the system administrator login screen 804 on the display unit 405 of the operation panel 211. Upon the user (administrator) successfully logging in to the printing apparatus 100 from the system administrator login screen 804, the CPU 202 displays the Google® Cloud Print registration start screen 803 on the display unit 405, and registers the printing apparatus 100 to the cloud-based printing service 102.

FIG. 9 is a screen transition diagram corresponding to the flowchart illustrated in FIG. 7 that shows processing performed by the printing apparatus 100 upon receipt of the cloud-based printing service registration request 111 (in a case in which the ID management setting is ON).

A screen 906 is a default screen for the case in which the user has not logged in to the printing apparatus 100. Upon the user logging in to the printing apparatus 100, the CPU 202 displays a default screen 901 for the case in which the user has logged in to the printing apparatus 100, on the display unit 405 of the operation panel 211. In a situation in which the screen 906, for the case in which the user has not logged in to the printing apparatus 100, is being displayed, the printing apparatus 100 receives the cloud-based printing service registration request 111 from the client terminal 101. Consequently, the CPU 202 displays the login request message screen 905 on the display unit 405 of the operation panel 211. The screen 905 notifies the user of the fact that processing responding to the cloud-based printing service registration request 111 cannot be executed because the user has not logged in to the printing apparatus 100. Furthermore, if the system management setting is ON, logging in by a system administrator is requested.

Also, in a situation in which the default screen 901, for the case in which the user has logged in to the printing apparatus 100, is being displayed, if the printing apparatus 100 receives the cloud-based printing service registration request 111 from the client terminal 101, the CPU 202 determines whether or not the user who has logged in to the printing apparatus 100 has administrator authority. Upon determining that the user who has logged in to the printing apparatus 100 has administrator authority, the CPU 202 displays the Google® Cloud Print registration screen 902 on the operation panel 211. Upon the user selecting the "NO" button 911 on the Google® Cloud Print registration screen 902, the CPU 202 displays the default screen 901 for the case in which the user has logged in to the printing apparatus 100, on the operation panel 211. On the other hand, upon the user selecting the "YES" button 910 on the Google® Cloud Print registration screen 902, the CPU 202 displays a Google® Cloud Print registration start screen 903 on the operation panel 211. Then, the CPU 202 starts registration of the printing apparatus 100 to the cloud-based printing service 102.

In a situation in which the default screen 901, for the case in which the user has logged in to the printing apparatus 100, is being displayed, if the printing apparatus 100 receives the cloud-based printing service registration request 111 and the login user does not have administrator authority, the CPU 202 displays the login request message screen 904 on the display unit 405. The login request message screen 904 requests a system administrator to log in to the printing apparatus 100.

FIG. 10 is a flowchart illustrating processing performed by the printing apparatus 100 according to Embodiment 1 when executing cloud printing. Note that a program used for executing this processing is stored in the ROM 204 or the HDD 214, for example. When the processing is to be executed, the program is loaded to the RAM 203, and is then executed under the control of the CPU 202. The processing is thus realized.

Once the printing apparatus 100 has been registered to the cloud-based printing service 102, the CPU 202 is connected to the cloud-based printing service 102 using Extensible Messaging and Presence Protocol (XMPP) in order to receive a job reception notification from the cloud-based printing service 102. The CPU 202 thereafter remains in this state. Upon receiving the print data 115 from the client terminal 101, the cloud-based printing service 102 notifies the printing apparatus 100 of the reception of the job, using XMPP. Thus, processing indicated by the flowchart shown in FIG. 10 is started.

First, in step S1001, the CPU 202 receives a job reception notification that notifies the CPU 202 of the reception of jobs by the cloud-based printing service 102. Next, the CPU 202 proceeds to step S1002, connects to the cloud-based printing service 102 using Hypertext Transfer Protocol (HTTP), and obtains a job list. Processing performed in steps S1004 and S1005, following step S1003, is repeated the number of times that is equal to the number of jobs included in the job list. In step S1004, the CPU 202 connects to the cloud-based printing service 102 using HTTP, and downloads print data specified by the corresponding job from the cloud-based printing service 102. Next, the CPU 202 proceeds to step S1005, and transfers the print data thus downloaded, to the image processing unit 306. In step S1006, the CPU 202 causes the image processing unit 306 to execute image processing on the print data. Thus, in step S1006, the image processing unit 306 converts the print data into data that can be printed by the printing apparatus 100. Then, the CPU 202 proceeds to step S1007, and outputs the print data that has undergone image processing to the printer 207 via the printer OF 206. Thus, the print data is printed. Processing performed between step S1003 and step S1008 is repeated the number of times that is equal to the number of jobs included in the job list obtained in step S1002.

The user of the client terminal 101 is thus able to execute printing via the cloud-based printing service 102, using the printing apparatus 100 registered to the cloud-based printing service 102.

Embodiment 2

Next, a description is given of Embodiment 2 of the present invention. Embodiment 2 provides further convenience to the user by omitting the login processing from Embodiment 1. Embodiment 2 includes Embodiment 1, and the difference from Embodiment 1 lies in the processing after "NO" in step S702 and step S708 in the flowchart illustrated in FIG. 7. In this processing according to Embodiment 1, the CPU 202 displays a message screen in each of steps S703 and S709, and then ends the processing. According to Embodiment 2, however, the CPU 202 is enabled to execute registration to the cloud-based printing service 102 in a particular case. This feature is described below. Note that the configurations of the printing system and the printing apparatus 100 according to Embodiment 2 are the same as those according to Embodiment 1 above, and a description thereof is omitted.

FIG. 11 is a flowchart illustrating processing performed by the printing apparatus 100 according to Embodiment 2 of the present invention. This flowchart illustrates processing performed after the CPU 202 has determined in the negative ("NO", i.e., the printing apparatus 100 is not in the login state) in step S702 of the flowchart shown in FIG. 7 according to Embodiment 1 above. Note that a program used for executing this processing is stored in the ROM 204 or the HDD 214, for example. When the processing is to be executed, the program is loaded to the RAM 203, and is then executed under the control of the CPU 202. The processing is thus realized.

First, in step S1101, the CPU 202 reads out an ID management database (DB) 1300 (FIG. 13) stored in the storage unit 305. Then, the CPU 202 proceeds to step S1102, and determines whether or not the user ID included in the cloud-based printing service registration request 111 is included in Google® Cloud Print user IDs in the ID management DB 1300. Upon determining that the user ID is included in the ID management DB 1300, the CPU 202 determines whether or not the user has system administrator authority. Upon determining that the user has system administrator authority, the CPU 202 proceeds to step S1103, and displays, for example, the Google® Cloud Print registration start screen 903 on the display unit 405. Then, the CPU 202 transmits the cloud-based printing service registration request 112 to the cloud-based printing service 102, thereby executing cloud-based printing service registration.

On the other hand, upon determining in step S1102 that the user does not have system administrator authority, the CPU 202 proceeds to step S1104, displays, for example, the login request message screen 905 shown in FIG. 9 on the display unit 405 of the operation panel 211, and ends this processing.

Due to the above-described processing being performed, registration to the cloud-based printing service 102 can be executed if the user who made a registration request from the client terminal 101 has system administrator authority of the printing apparatus 100, even if the user has not logged in to the printing apparatus 100.

FIG. 12 is a flowchart illustrating processing performed by the printing apparatus 100 according to Embodiment 2 of the present invention. This flowchart illustrates processing performed after the CPU 202 has determined in the negative ("NO", i.e., a user who is not a system administrator has logged in to the printing apparatus 100) in step S708 of the flowchart shown in FIG. 7 according to Embodiment 1. Note that a program used for executing this processing is stored in the ROM 204 or the HDD 214, for example. When the processing is to be executed, the program is loaded to the RAM 203, and is then executed under the control of the CPU 202. The processing is thus realized.

First, in step S1201, the CPU 202 reads out the ID management DB 1300 stored in the storage unit 305. Then, the CPU 202 proceeds to step S1202, and performs a search in order to determine whether or not the user ID included in the cloud-based printing service registration request 111 from the client terminal 101 is included in Google® Cloud Print user IDs that are listed in the ID management DB 1300. Upon determining that the user ID is included in the ID management DB 1300, the CPU 202 determines whether or not the user has system administrator authority. Upon determining that the user has system administrator authority, the CPU 202 proceeds to step S1203, and transmits the cloud-based printing service registration request 112 to the cloud-based printing service 102, thereby executing registration to the cloud-based printing service 102.

Upon determining in step S1202 that the user does not have system administrator authority, the CPU 202 proceeds to step S1204. In step S1204, the CPU 202 displays, for example, the login request message screen 904 shown in FIG. 9 on the display unit 405, requesting the user to log in to the printing apparatus 100 as a system administrator, and ends this processing.

Due to the above-described processing being performed, even if a user who is not an administrator has logged in to the printing apparatus 100, registration to the cloud-based printing service 102 can be executed depending on the authority of the user of the client terminal 101. That is to say, registration to the cloud-based printing service 102 can be executed if the user of the client terminal 101 is a user who has authority to execute registration to the cloud-based printing service 102 and has system administrator authority for the printing apparatus 100.

FIG. 13 is a diagram illustrating the ID management DB 1300 held by the printing apparatus 100 according to Embodiment 2.

The ID management DB 1300 is a database for managing the ID information of users, and is stored in the storage unit 305. The ID information includes a user name 1301, a Google® Cloud Print user ID 1302, and system administrator authority 1303. The user name 1301 is a user ID for uniquely identifying a user of the printing apparatus 100. The Google® Cloud Print user ID 1302 is a user ID that is associated with the user name 1301 and indicates that the user has authority to execute registration to Google® Cloud Print. The system administrator authority 1303 indicates whether or not the corresponding user has system administrator authority. As described above, since the user ID, the cloud-based printing service user ID that is allowed to execute registration to the cloud-based printing service, and the presence or absence of administrator authority are stored in association with each other, whether or not to execute registration to the cloud-based printing service can be determined based only on the user ID.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printing apparatus that can be registered to a printing service on the Internet, the printing apparatus comprising:
    a login function configured to be switched ON and OFF;
    a display that displays a registration screen used for providing an instruction to execute registration to the printing service and an administrator login screen, upon receipt of a request for registration to the printing service from a client, in a case in which the login function of the printing apparatus is ON;
    a memory device that stores a set of instructions; and
    at least one processor that executes instructions, of the set of instructions, to execute the registration to the printing service upon an administrator successfully logging in to the printing apparatus via the administrator login screen,
    wherein, in a case in which the login function is OFF, the display displays the registration screen used for providing the instruction to execute the registration to the printing service, and the at least one processor executes the registration to the printing service in response to the instruction to execute the registration to the printing service.

2. The printing apparatus according to claim 1, wherein, upon receipt of the request for the registration to the printing service from the client, the at least one processor executes registration to the printing service without the administrator logging in to the printing apparatus via the administrator login screen, in a case in which the login function is OFF.

3. The printing apparatus according to claim 1, further comprising an identification (ID) management setting configured to be switched ON and OFF,
    wherein the at least one processor further executes the instructions:
        (i) to determine whether or not the ID management setting is ON; and
        (ii) to cause the display to display the administrator login screen,
    wherein the at least one processor executes the registration to the printing service in a case in which the at least one processor determines that the ID management setting is OFF.

4. The printing apparatus according to claim 3, wherein, in a case in which the at least one processor determines that the ID management setting is ON, the at least one processor causes the display to display the administrator login screen and to execute the registration to the printing service on a condition that the user has logged in to the printing apparatus.

5. The printing apparatus according to claim 3, wherein, in a case in which the at least one processor determines that the ID management setting is ON, and in a case in which the login function is ON, the at least one processor executes the registration to the printing service on a condition that the administrator has logged in to the printing apparatus.

6. The printing apparatus according to claim 3, further comprising a storage unit that stores a user ID and a presence or an absence of administrator authority in association with each other,
    wherein, upon receipt of the request for registration to the printing service from a user of the client, the at least one processor executes the registration to the printing service, without an administrator logging in to the printing apparatus via the administrator login screen, if the presence of administrator authority is stored in the storage unit in association with a user ID of the user of the client.

7. The printing apparatus according to claim 6, wherein if the at least one processor determines that the ID of a user ID management setting is ON, the at least one processor executes the registration to the printing service, without the administrator logging in to the printing apparatus via the administrator login screen, in a case in which the presence of administrator authority is stored in the storage unit in association with a user ID of the user.

8. The printing apparatus according to claim 1, wherein the at least one processor executes the registration to the printing service in response to the instruction being provided via the registration screen.

9. The printing apparatus according to claim 1, wherein the at least one processor further executes instructions:
    (i) to receive a job reception notification from the printing service;
    (ii) to request a job list from the printing service in response to receipt of the job reception notification;
    (iii) to download print data that corresponds to a job included in the job list transmitted by the printing service responding to the request; and
    (iv) to execute printing of the downloaded print data.

10. A control method for controlling a printing apparatus that can be registered to a printing service on the Internet, the method comprising:

providing a login function that can be switched ON and OFF;

displaying a registration screen used for providing an instruction to execute registration to the printing service and an administrator login screen, upon receipt of a request for registration to the printing service from a client, in a case in which the login function is ON;

executing the registration to the printing service upon an administrator successfully logging in to the printing apparatus via the administrator login screen; and displaying, in a case in which the login function is OFF, the registration screen used for providing the instruction to execute the registration to the printing service, and executing registration to the printing service in response to the instruction to execute the registration to the printing service.

11. A non-transitory computer-readable storage medium storing a program for causing a computer to execute steps of a control method for controlling a printing apparatus that can be registered to a printing service on the Internet, the control method comprising:

providing a login function that can be switched ON and OFF;

displaying a registration screen used for providing an instruction to execute registration to the printing service and an administrator login screen upon receipt of a request for registration to the printing service from a client in a case in which the login function is ON;

executing the registration to the printing service upon an administrator successfully logging in to the printing apparatus via the administrator login screen; and displaying, in a case in which the login function is OFF, the registration screen used for providing the instruction to execute the registration to the printing service, and executing registration to the printing service in response to the instruction to execute the registration to the printing service.

12. A printing apparatus that can be registered to a printing service on the Internet, the printing apparatus comprising:

a login function configured to be switched ON and OFF;

a display that displays a registration screen used for providing an instruction to execute registration to the printing service and an administrator login screen, in a case in which the login function is ON;

a memory device that stores a set of instructions; and at least one processor that executes instructions, of the set of instructions, to execute the registration to the printing service upon an administrator successfully logging in to the printing apparatus via the administrator login screen, wherein, in a case in which the login function is OFF, the display displays the registration screen used for providing the instruction to execute the registration to the printing service, and the at least one processor executes registration to the printing service, in response to the instruction to execute the registration to the printing service.

* * * * *